United States Patent [19]
Muntz

[11] 4,130,552
[45] Dec. 19, 1978

[54] POLYESTER CATALYST SYSTEM AND PROCESS
[75] Inventor: Ronald L. Muntz, Bedford Hills, N.Y.
[73] Assignee: Stauffer Chemical Company, Westport, Conn.
[21] Appl. No.: 828,052
[22] Filed: Aug. 26, 1977

Related U.S. Application Data
[62] Division of Ser. No. 729,752, Oct. 5, 1976, abandoned.
[51] Int. Cl.² .............................................. C08G 63/32
[52] U.S. Cl. ..................................... 528/285; 560/92; 260/446
[58] Field of Search ................ 260/75 R, 446; 560/92

[56] References Cited
U.S. PATENT DOCUMENTS

| | | | |
|---|---|---|---|
| 3,484,410 | 12/1969 | Lazarus et al. | 260/75 R |
| 3,732,182 | 5/1973 | Chimura et al. | 260/75 R |
| 3,822,239 | 7/1974 | Chimura et al. | 260/75 R |
| 3,899,522 | 8/1975 | Loeffler | 260/75 R X |

FOREIGN PATENT DOCUMENTS 1053486  3/1959  Fed. Rep. of Germany ........... 260/446

Primary Examiner—Lucille M. Phynes
Attorney, Agent, or Firm—William R. Robinson

[57] ABSTRACT

A polycondensation catalyst consisting essentially of the reaction product of an unsaturated $\alpha,\beta$-dicarboxylic acid anhydride and an antimony alkoxide.

6 Claims, No Drawings

POLYESTER CATALYST SYSTEM AND PROCESS

This is a division of application Ser. No. 729,752 filed Oct. 5, 1976 now abandoned.

BACKGROUND OF THE INVENTION

This invention relates to a catalyst for the polycondensation step of polyester production. More particularly, this invention relates to a stable catalyst for the production of linear polyesters and co-polyesters. This invention also relates to a polymerization process employing the catalyst.

Polymers and copolymers of alkylene terephthalate have found wide-spread commercial acceptance. For example, polyesters are used in the manufacture of textile fibers, films, resins, etc.

It is known that polyalkylene terephthalates can be prepared from a suitable alkyl ester of terephthalic acid formed by initially reacting the appropriate alcohol with terephthalic acid. When a methyl ester of terephthalic acid is used as a starting material, it is first reacted with alkylene glycol in the presence of a transesterification catalyst by means of an ester interchange reaction. When terephthalic acid, itself, is used as a starting material, it is subjected to a direct esterification reaction with alkylene glycol in the presence of what is generally called the first stage catalyst additive or ether inhibitor. In either method the resulting reaction product, an ester, is then polycondensed in the presence of a polycondensation catalyst to form polyalkylene terephthalate.

To polymerize a bis(hydroxyalkyl) terephthalate in a reasonable time it is necessary to use a catalyst. Many catalysts have been disclosed for this purpose but it has been found that those giving a rapid production rate also tend to bring about a rapid rate of polymer degradation. Another disadvantage is that many of the known catalysts produce a polymer having a yellowish or gray color. For the manufacture of fibers a color as near white as possible is required and for film making a clear bright polymer is necessary.

It has also long been known in the art that trivalent antimony compounds are excellent polycondensation catalysts. Antimony oxide has been long employed for this use as have various salts and alcohol derivatives such as the alkyl and aryl antimonites, the antimony glycolates, antimony acetates, and antimony oxalate.

However, many of these antimony-containing catalysts produce undesirable side effects, such as a slow rate of reaction, or polymer having a gray color which is undesired in the final terephthalate polymer. It is believed, as discussed in U.S. Pat. No. 3,732,182, that poor rates and gray color formation are caused by a reduction of the antimony catalyst to finely divided metallic antimony. This problem as indicated above has long been known and many attempts have been made to provide a solution.

For example, the aforementioned U.S. Pat. No. 3,732,182 proposes the utilization of the reaction product of an α, β-dicarboxylic acid with an antimony compound as a polycondensation catalyst. U.S. Pat. No. 3,822,239 discloses a complex of an acid anhydride, a glycol and an antimony compound for the same application. Another example of a complex containing an acid anhydride is found in U.S. Pat. No. 3,903,120 which teaches the preparation of zerovalent nickel complexes useful as catalysts for the hydrocyanation of olefins, while U.S. Pat. No. 3,272,786 discloses low molecular weight polymers containing a tri-alkylstibine and maleic anhydride in admixture with other monomers.

Now it has been found in accordance with this invention that selected catalysts are efficacious polycondensation catalysts for the preparation of polyalkylene terephthalate.

SUMMARY OF THE INVENTION

The catalyst of this invention consists essentially of the reaction products of selected acid anhydrides with antimony alkoxides. These reaction products are stable, minimizing antimony reduction and effecting increased productivity. Furthermore, many of the catalysts of this invention result in the production of whiter polymers.

DETAILED DESCRIPTION OF THE INVENTION

More particularly the catalyst of this invention consists essentially of the reaction product of an unsaturated α, β-dicarboxylic acid anhydride having 4 to 12 carbon atoms and an antimony alkoxide.

Typical anhydrides which can be used in the present invention are those represented by the formulae;

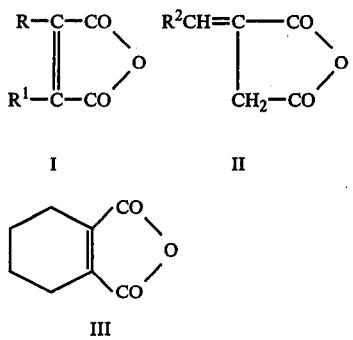

wherein R and R$^1$ are independently selected hydrogen, chlorine, or alkyl of 1 to 4 carbon atoms and R$^2$ is hydrogen, alkyl of 1 to 4 carbon atoms or phenyl. Exemplary anhydrides include maleic anhydride, tetrahydrophthalic anhydride, dimethylmaleic anhydride, dichloromaleic anhydride, methyl iso-butyl maleic anhydride, di-n-butyl maleic anhydride, citraconic anhydride, itaconic anhydride, etc.

The antimony-containing polycondensation catalysts of this invention comprise anhydride derivatives of the known antimony alkoxides having the formula:

Sb(OR$^4$) (OR$^5$) (OR$^6$)   IV where R$^4$, R$^5$ and R$^6$ are independently selected hydrogen, alkyl, acyl, aryl or substituted aryl, with the proviso that at least one of R$^4$, R$^5$ and R$^6$ must be other than acyl, the alkyl and acyl groups having 1 to 18 carbon atoms and the aryl groups having 6 and 18 carbon atoms, and the substituted aryl having substituents such as phenyl, naphthyl, methylphenyl, ethylphenyl, chlorophenyl, dimethylphenyl, methoxyphenyl, etc. Exemplary alkoxides include trimethyl antimonite, tributyl antimonite, trihexyl antimonite, tridodecyl antimonite, tricyclohexyl antimonite, diethylmethyl antimonite, diethylacetyl antimonite and diethylphenyl antimonite. The preferred polycondensation catalysts are the derivatives of the trialykl antimonites, and particularly triethyl antimonite, tributyl antimonite, and tripropyl antimonite.

In the practice of this invention, the components of the catalyst are employed in a mole ratio of the acid anhydride to the antimony alkoxide of 0.5:1 to 3:1 and preferably in a ratio of 1:1 to 2:1. The reaction product is generally a mixture of compounds having the formula:

$$(ZO)_x Sb(O_2CACO_2Z)_y$$

where Z is $R^4$, $R^5$, or $R^6$ as previously described; A is

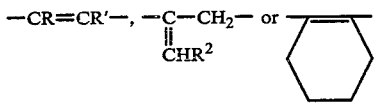

wherein R, $R^1$ and $R^2$ are as previously described; y is an integer from 1 to 3 and x is 0 to 2, with the proviso that $x + y = 3$. The mole ratio of the reactants governs the composition of the reaction product. Thus, when three moles of anhydride are employed per mole of antimony alkoxide, compound V where x is 0 and y is 3 will predominate.

The reaction product is prepared by mixing the anhydride and the antimony alkoxide in the absence of solvent at temperatures between about 0° and 250° C., preferably between about 50° and 150° C. The reaction product is conveniently used directly in the polycondensation process.

Although the catalyst of this invention is a polycondensation catalyst, it is not necessary to add the catalyst immediately prior to the polycondensation step. Thus, if desired, it can be employed directly from the beginning of the process where the glycol terephthalates are prepared.

As previously indicated, the glycol terephthalates, which are employed in the polycondensation process of this invention, are prepared either by direct esterification of terephthalic acid with an appropriate glycol such as ethylene glycol, 1,4-butanediol, 1,4-cyclohexane-dimethanol, mixtures thereof, etc., or by the ester-interchange of a lower dialkyl ester of terephthalic acid with the glycol. This preliminary esterification or ester-interchange step is carried out according to known techniques. The resulting glycol terephthalate is then condensed in the presence of the catalyst system of this invention.

Various additives can be employed in this polycondensation step. For example, phosphorous containing compounds, which are known to inhibit the ester-interchange reaction described above can be employed. Typical phosphorous containing compounds include triphenyl phosphite, triphenyl phosphine, trihexylphosphate, triphenyl phosphate, tributylphosphate, triethylphosphate and mono sodium phosphate. Copolycondensation components such as phthalic acid, succinic acid and the like can also be employed.

The polycondensation process of this invention is carried out at temperatures of about 150° to about 350° C., preferably in an inert atmosphere. A vacuum is generally applied to remove volatiles and the resulting polymer employed in the manufacture of fibers, resins, films, etc.

The following examples will serve to illustrate the practice of this invention.

EXAMPLE 1

(a) Reaction Product Preparation

Maleic anhydride (196.0 grams; 2.00 mole) was added in about 25 gram portions to tri-n-butyl antimonite (341.0 grams; 1.00 mole) in a one-liter, 3-necked flask equipped with a thermometer, magnetic stirrer and nitrogen inlet. An exotherm was observed giving a maximum pot temperature of 80° C. The product was a clear light yellow liquid.

The following data was consistent with a formula for the major component of the reaction product of:

$$CH_3CH_2CH_2CH_2OSb(O_2CCH=CHCO_2C_4H_9)_2$$

Infrared Analysis: Disappearance of the anhydride carbonyl indicating reaction of the carbonyl groups in the maleic anhydride; appearance of absorptions typical of an ester carbonyl at 1730 cm$^{-1}$ and an antimony acylate at 1640 cm$^{-1}$.

(b) Polycondensation

Bis-hydroxyethyl terephthalate (33.0 grams), triphenyl phosphite (0.020 grams) and 0.47 grams of the maleic anhydride reaction product prepared in part (a) were mixed in a 50 ml 2-neck flask equipped with a magnetic stirrer, a short-path distillation head and a thermometer. The mixture was heated to about 160° C. and a vacuum applied. The polycondensation was carried up to a temperature of 280° C. and an absolute pressure of 1 mm Hg over a period of 1 hour. Seven to eight grams of ethylene glycol were distilled out of the mixture.

The resultant polymer was poured onto a watch glass, cooled and ground to a fine powder in a high speed blender. The powder was placed in a petri dish to form a layer about ¼ inch thick and held in place with a large rubber stopper. The color of the sample was then measured on a Hunterlab Model D25 Color Difference Meter, sold by Hunter Associates Laboratory, McLean, Virginia, employing Hunterlab Standard T400 for color difference meter 45° 0° geometry, CIE Illuminant C, ASTM D2244-647 Standard; MgO (ASTM E-259). An average L value of 87.4 for two measurements was obtained.

COMPARATIVE EXAMPLE 1

The polycondensation step of Example 1 was repeated with the exception that tri-n-butyl antimonite (0.30 grams) was employed instead of the reaction product. The color of five samples of the resultant polymer was measured, and an average L value of 81.7 was obtained. This indicates that the use of catalyst without stabilizer results in graying.

What is claimed is:

1. A process for preparing polyester comprising condensing glycol terephthalate in the presence of a polycondensation catalyst system consisting essentially of the reaction product of an unsaturated α, β-dicarboxylic acid anhydride having 4 to 12 carbon atoms and an antimony alkoxide.

2. The process of claim 1 wherein said antimony alkoxide is a trialkyl antimonite.

3. The process of claim 2 wherein said anhydride has the formula

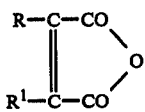
where R and R¹ are individually selected hydrogen or alkyl of 1 to 4 carbon atoms.
4. The process of claim 3 wherein said anhydride is maleic anhydride.
5. The process of claim 3 wherein said antimony alkoxide is tributyl antimonite.
6. The process of claim 3 wherein said catalyst consists essentially of the reaction product of maleic anhydride and tributyl antimonite.
* * * * *

UNITED STATES PATENT AND TRADEMARK OFFICE
CERTIFICATE OF CORRECTION

PATENT NO. : 4,130,552
DATED : December 19, 1979
INVENTOR(S) : Ronald L. Muntz

It is certified that error appears in the above-identified patent and that said Letters Patent are hereby corrected as shown below:

Column 3, line 10

Enter V under formula

Column 3, line 15

Change formula $-CR=CR'-$, to $-CR=CR^1-$

Signed and Sealed this

Twenty-ninth Day of May 1979

[SEAL]

Attest:

RUTH C. MASON
Attesting Officer

DONALD W. BANNER
Commissioner of Patents and Trademarks